US006595466B2

United States Patent
Depeige et al.

(10) Patent No.: US 6,595,466 B2
(45) Date of Patent: Jul. 22, 2003

(54) BOARDING DEVICE FOR AIRCRAFT AND FLYING WINGS EQUIPPED WITH SUCH A DEVICE

(75) Inventors: Alain Depeige, Tournefeuille (FR); Jean-Luc Jarrige, La Salvetat St Gille (FR)

(73) Assignee: Airbus France (FR)

( * ) Notice: Subject to any disclaimer, the term of this patent is extended or adjusted under 35 U.S.C. 154(b) by 0 days.

(21) Appl. No.: 09/983,469

(22) Filed: Oct. 24, 2001

(65) Prior Publication Data

US 2002/0063187 A1 May 30, 2002

(30) Foreign Application Priority Data

Nov. 28, 2000 (FR) .............................................. 00 15320

(51) Int. Cl.[7] ................................................. B64D 9/00
(52) U.S. Cl. .................. 244/118.3; 244/36; 244/129.5; 244/137.2
(58) Field of Search ............................. 244/117 R, 119, 244/129.4, 129.5, 36, 137.1, 118.3, 118.1, 120

(56) References Cited

U.S. PATENT DOCUMENTS

| 2,224,641 A | * | 12/1940 | Burnelli ..................... 224/36 |
| 2,547,811 A | * | 4/1951 | Burnelli ................... 244/118.3 |
| 2,650,780 A | * | 9/1953 | Northrop et al. ............. 244/36 |
| 2,759,691 A | * | 8/1956 | Weaver et al. ........... 244/118.3 |
| 2,765,131 A | * | 10/1956 | Boyle ......................... 244/905 |
| 2,942,812 A | * | 6/1960 | Pauli ......................... 244/118.3 |
| 2,942,816 A | * | 6/1960 | Dostie ..................... 244/137.2 |
| 3,508,727 A | | 4/1970 | Williams |
| 3,774,864 A | * | 11/1973 | Hurkamp ..................... 244/36 |
| 4,449,679 A | * | 5/1984 | McComas ................... 244/120 |
| 4,512,539 A | | 4/1985 | Ackermann et al. |
| 4,699,336 A | | 10/1987 | Diamond |
| 5,893,535 A | * | 4/1999 | Hawley ..................... 244/119 |
| 6,382,562 B1 | * | 5/2002 | Whitlock et al. ........ 244/118.3 |

FOREIGN PATENT DOCUMENTS

FR 1603439 4/1971

* cited by examiner

*Primary Examiner*—Galen L. Barefoot
(74) *Attorney, Agent, or Firm*—Thelen Reid & Priest, LLP; Robert E. Krebs

(57) ABSTRACT

Boarding device for aircraft and flying wings equipped with such a device.

The boarding device consists of at least one tunnel (20) connected to the outside of the aerodynamic shell (12) of the aircraft. More precisely, the tunnel is attached to the trailing edge of the fairing (12) and it extends aft approximately parallel to the longitudinal axis of the aircraft. A door (22) closes off the opening between the passenger cabin (10) and the tunnel (20). The rear part (26) of the tunnel (20) is articulated and/or detachable. In order to evacuate the passengers in an emergency, the front, fixed part of the tunnel (24) can be fitted with an inflatable escape slide or an articulated floor.

11 Claims, 4 Drawing Sheets

BOARDING DEVICE FOR AIRCRAFT AND FLYING WINGS EQUIPPED WITH SUCH A DEVICE

TECHNICAL ASPECTS

The invention concerns a boarding device, designed to enable passengers to embark and disembark from an aircraft in the shortest possible time.

Such a device is principally intended for very large capacity aircraft, in which the embarking and disembarking times are particularly long.

The invention also covers a flying wing equipped with such a boarding device.

STATE OF THE TECHNOLOGY

In aircraft dedicated to the commercial transportation of passengers, access for boarding is achieved via side doors which open directly into the aircraft fuselage.

On existing aircraft, there are different types of doors. More precisely, they are classified according to their dimensions and the number of passengers which they are able to evacuate simultaneously during an emergency. Thus on large capacity aircraft, the dimensions of the doors and the characteristics of their associated escape slides are able to evacuate passengers two at a time.

If one considers existing aircraft doors merely from the point of view of embarking and disembarking of passengers, their dimensions are inadequate. Every day, passengers are complaining that these operations are always long and fastidious at stop-overs. Moreover these problems are becoming worse as the number of passengers carried increases.

The number of passengers carried in the aircraft currently being designed by the manufacturers, is significantly greater than in existing aircraft. Thus "flying wing" type aircraft will be capable of carrying around 900 passengers, i.e. nearly double the numbers carried in present-day large capacity airliners.

The use of conventional access doors for embarking and disembarking such a quantity of passengers would lead to transfer times which would be difficult to accept.

The problem is even more serious if one considers the emergency evacuation of passengers. On airliners intended for carrying passengers, the latter must be able to be evacuated, on the ground, in critical situations, such as for example a wheels-up landing. The evacuation of passengers must then be achieved as quickly as possible, whilst at the same time avoiding injuries such as burns, sprains, etc.

On existing aircraft, evacuation of passengers on the ground, takes place laterally, from each side of the aircraft, via the doors used for embarking and disembarking passengers, and via emergency exits opening onto the wings.

Emergency evacuation slides are associated with these various emergency exits, in order to permit rapid evacuation of the passengers following a crash. These slides usually consist of inflatable structures, which are stored folded in a special location inside the aircraft.

This conventional solution is illustrated in particular in document U.S. Pat. No. 4,512,539, which describes a device for automatically deploying an inflatable slide from a lateral access door, when the door is opened in an emergency situation.

The certification authorities' regulations stipulate that total evacuation of an aircraft must be achieved within 90 seconds. This time interval begins when the evacuation signal (illuminated signs, audio signal etc.) is given and ends when the entire crew and passengers reach the ground. This therefore includes opening of the doors, inflation of the escape slides, evacuation of the passengers, checking by the crew that all passengers have in fact left the aircraft, and evacuation of the crew. These various stages are made all the more difficult to implement within the allocated time, since one must take into account the inevitable hesitation of the passengers before using the escape slides, as well as the generally angular route adopted by passengers to reach the emergency exits.

On existing aircraft, the use of large size doors and suitable slides enables the evacuation of average sized passengers two abreast. This enables the aircraft to be totally evacuated within the 90-second time allotted by the certification authorities.

However, the use of these type of doors on aircraft capable of carrying up to double the number of passengers than on existing aircraft, would not enable all the passengers to be evacuated within the allotted time without drastically increasing the number of exits.

Additionally, in the particular case of an aircraft with no fuselage, such as a flying wing, the solutions habitually used are not directly applicable. Thus for example, one cannot transpose to such an aircraft, the emergency exits located above the wing of a conventional aircraft, since there is no fuselage-wing joint on an aircraft which has no fuselage.

On the "flying wing" type of aircraft currently being studied, it is intended to locate a large number of access doors at the extreme front of the aircraft, for embarkation, disembarkation and emergency evacuation of the passengers. However, this solution is not altogether satisfactory. In the event of a landing in an unsafe area (forest, etc.), the resulting structural damage would be likely to render the emergency exits unusable.

Another solution consists in using a closed rescue capsule to bring the passengers of an aircraft in distress, safely back to earth or the sea.

A solution of this type is described in document FR-A-1 603 439. In this case, the capsule includes the cockpit, the passenger compartment and the luggage bay. When the situation demands, the capsule detaches itself automatically, in order to separate from the engines, the wings and the fin. Parachutes open during the ejection, in order to slow down the capsule.

However, these rescue capsules are particularly heavy, which makes this solution difficult to apply to passenger airliners. This type of capsule, has incidentally not been applied to any existing aircraft.

Document U.S. Pat. No. 4,699,336 also considers the use of a jettisonable survival capsule. When the situation demands, the capsule is ejected from the rear of the aircraft, after the tail of the aircraft has been ejected first. In this case, the capsule contains only the passenger cabin. As in the previous document, parachutes are used to slow the descent of the capsule so that it does not crash to the ground. For the same reason as for the capsule described in document FR-A-1 603 439, this solution is not applicable in practice to a passenger-carrying airliner.

PRESENTATION OF THE INVENTION

The invention precisely concerns a device to provide access for embarking, disembarking and emergency evacuation of passengers under the conditions required by the applicable regulations, including for very large capacity aircraft, in particular of the "flying wing" type.

In accordance with the invention, this result is achieved using an embarkation access device, for an aircraft which includes a passenger compartment which is delimited by an aerodynamic aircraft shell, the device including at least one tunnel joined to the outside of the said aerodynamic shell, attached to a trailing edge of the latter, and extending aft in a direction approximately parallel to the aircraft longitudinal axis, and with a door normally sealing off the opening between the passenger compartment and the tunnel.

Using one or preferably, several tunnels of this type, extending the aircraft aerodynamic shell horizontally aft, it is possible to embark and disembark a large number of passengers simultaneously. In emergency situations, these same tunnels permit passengers to be evacuated to the ground in perfect safety, very rapidly.

The invention is particularly suited to aircraft of the "flying wing" type. In this configuration, it is possible to locate several tunnels side by side, in order to significantly reduce the time required for embarking and disembarking and in the event of emergencies, allowing for very fast evacuation of the passengers.

Thus in this case, several tunnels may advantageously by located between adjacent elevons, articulated from the trailing edge of the aerodynamic fairing of the flying wing.

In order to further enhance the flows during embarkation, disembarkation and emergency evacuation of passengers, it is advantageous to position each tunnel approximately in-line with the extended aisle formed between the seat rows in the aircraft passenger compartment.

In practice, each tunnel should ideally consist of at least one detachable part, which can be jettisoned in the event of an accident.

The rear detachable part would then preferably be articulated from the aerodynamic shell, in order to be able to hinge to one side, in the manner of a door, to permit the passengers to embark or disembark.

One particularly favourable configuration from the point of view of aerodynamic flow, is for the rear part of each tunnel to be approximately cone-shaped.

In an initial implementation mode for the invention, an inflatable evacuation slide is housed in each tunnel, inside the fixed part, on which the detachable rear part is mounted.

In an alternative implementation mode for the invention, a fixed section of each tunnel, to which the rear detachable part is attached, includes a floor which is articulated close to the threshold of the door. This floor is therefore able to hinge downwards thus forming an emergency evacuation slide for the passengers.

In this case, the articulated floor, should preferably be fitted with steps, which may for example be retractable, for embarking and disembarking passengers.

The invention also covers a flying wing fitted with an embarkation access device as defined above.

BRIEF DESCRIPTION OF DRAWINGS

A description follows of a non-exclusive set of examples of the different implementation modes of the invention, referring to the drawings provided in the appendix, in which.

DETAILED DESCRIPTION OF THE TWO PREFERRED IMPLEMENTATION MODES OF THE INVENTION

Figure 1:
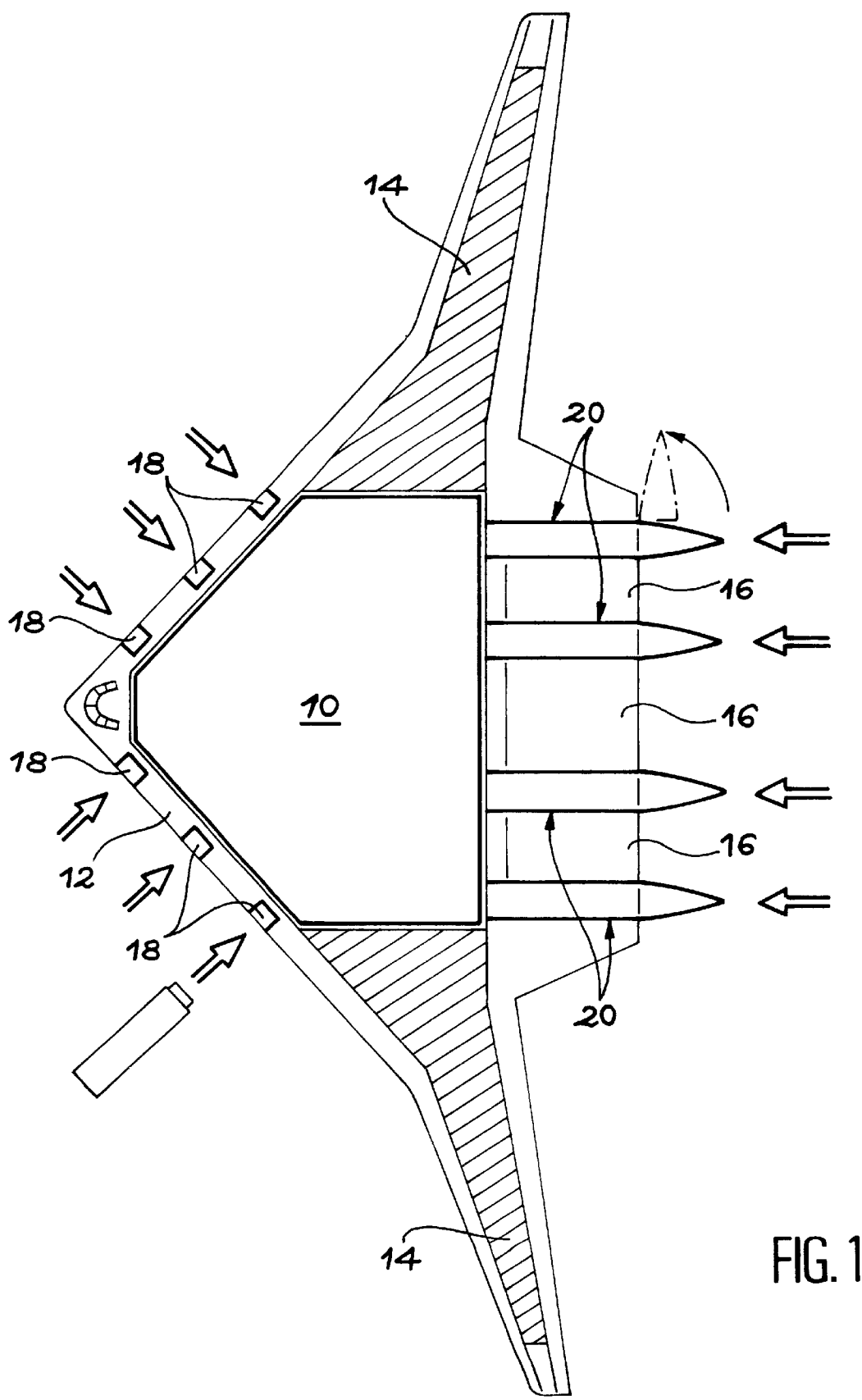
FIG. 1 is a top view, which shows in schematic form, a flying wing equipped with boarding tunnels as described by the invention.

FIG. 1 shows very schematically, a large capacity flying wing, intended for carrying commercial passengers.

All the centre part of the flying wing forms a passenger compartment (10). Depending on the configuration, the passenger compartment (10) may hold up to 900 passengers. The compartment is pressurised and is delimited essentially by the aerodynamic fairing (12) which forms the external shell of the aircraft. The two side parts of the flying wing for bays (14) which in particular contain the fuel tanks.

In order to control the flying wing, elevons (16) are hinged from the trailing edge of the aerodynamic fairing (12), about an axis which is horizontal and transverse in relation to the aircraft.

According to a known layout, doors (18) are located in the leading edge of the aerodynamic fairing (12). These doors (18) are principally intended for embarking and disembarking passengers. They may also be used for emergency evacuation of passengers, providing they are not obstructed by external obstacles such as trees.

According to the invention, the flying wing shown in FIG. 1 is equipped with additional access devices, located at the rear of the passenger compartment (10).

These access devices include tunnels (20) which are mounted on the outside of the aerodynamic fairing (12), as well as doors (22) located between the passenger compartment (10) and each of the tunnels (20). In the implementation mode illustrated as an example in FIG. 1, four tunnels are attached to the trailing edge of the aerodynamic fairing (12). However, it is easy to understand that the number of tunnels may be varied without affecting the scope of the invention. As a general rule, the number of tunnels (20) should be adapted to the number of passengers to embark on the aircraft.

The tunnels (20) are straight and extend aft in a direction approximately parallel to the longitudinal axis of the flying wing, i.e. along an approximately horizontal axis.

Figure 2:
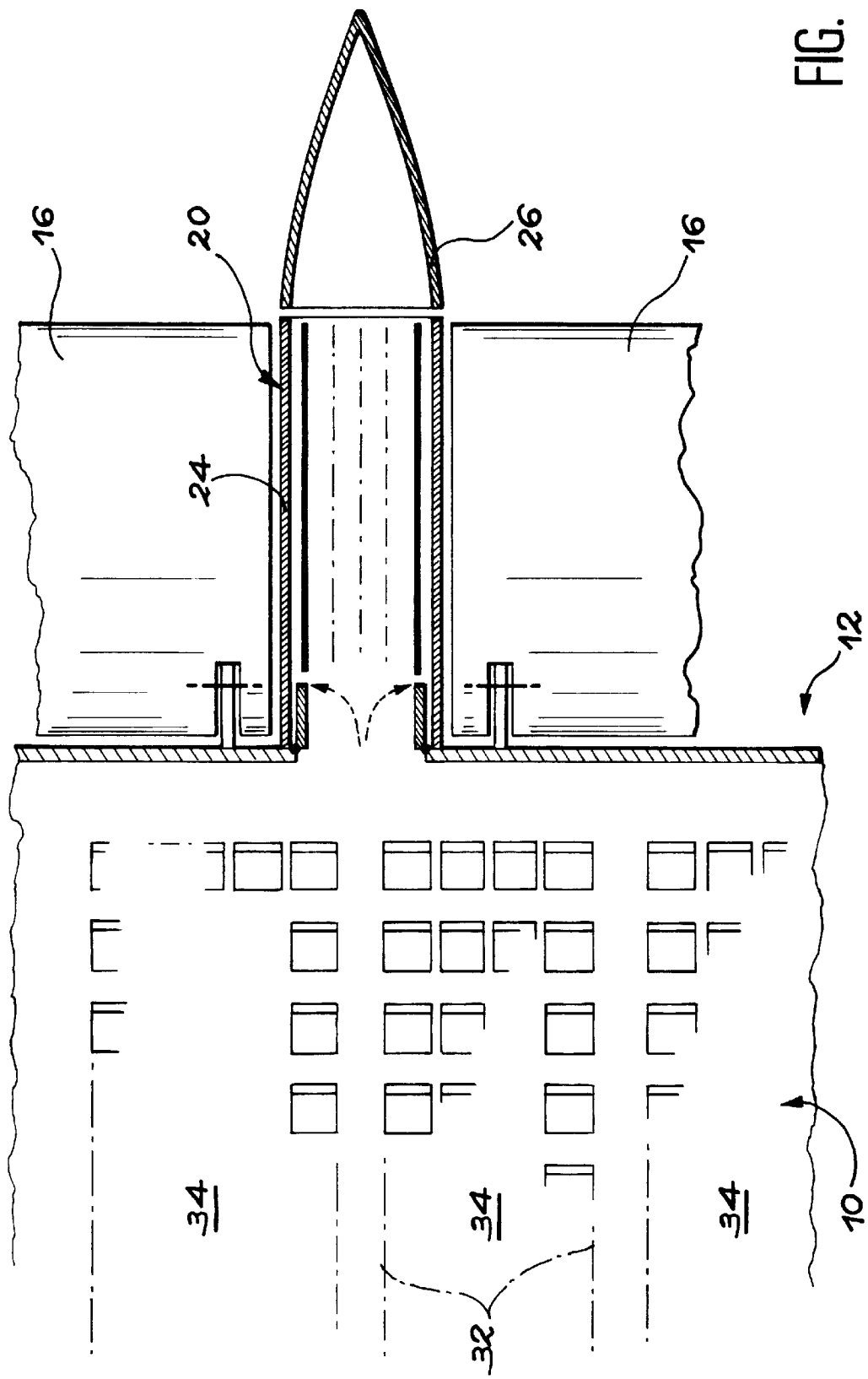
FIG. 2 is a part cut-away viewed from above, showing in larger scale, one of the flying wing tunnels illustrated in FIG. 1.

More precisely, and as shown in FIG. 2, each tunnel (20) consists of a fixed front section (24) and a detachable rear section (26).

The fixed front section (24) should preferably be characterised by an approximately uniform section, free from discontinuities, to permit the largest possible passenger flow. The generally rectangular internal cross-section, should in particular be sized in order to allow at least three or four passengers to walk through side by side. This layout is facilitated, in the case of a flying wing, by the fact that the aerodynamic fairing (12) is very wide. The front end of the fixed front section (24) is attached to the trailing edge of the aerodynamic fairing (12), forming the rear bulkhead of the passenger compartment (10). This is achieved using conventional mounting methods such as bolts, rivets, welding, bonding, etc.

The door (22) which may be single or double, as shown for example in FIG. 2, covers practically the entire internal cross-section of the tunnel (24), in order to avoid reducing the width of the passage available for passengers. The door (22) is located inline with or in the vicinity of the passenger compartment (10) rear bulkhead. When it is closed, it totally isolates the pressurised passenger cabin, from the non-pressurised inside of the tunnel. The door (22) is designed in accordance with conventional aircraft door standards, in particular regarding pressure differentials. As shown in FIG. 2, the door (22) preferably opens outwards into the tunnel (20), in order to facilitate emergency evacuation of passengers.

The rear detachable part (26) is preferably to be cone-shaped, in order not to disturb the aerodynamic air flow. This rear part (26) is secured at the rear end of the fixed section (24), such that it normally closes the tunnel (20) when the flying wing is airborne.

More precisely, the rear part (26) is articulated at its rear end to the fixed section (24) via a hinge (not shown), like a door, in order to be able to open sideways, as shown schematically in FIG. 1. Alternatively, the rear part (26) may also open downwards, upwards or like a clamshell (by splitting into two parts). Power assisted opening devices such as pistons, gears, etc. may be used. This configuration permits use of the tunnels (20) for embarking and disembarking the passengers.

Additionally, the rear section (26) of each of the tunnels (20) is mounted at the rear end of the fixed section (24) by fasteners (not shown) which enable this rear part to be jettisoned in the event of emergency evacuation of the passengers. Jettisoning of the rear detachable parts may be triggered either from inside the aircraft by the flight or cabin crew, or from outside the aircraft by the rescue teams, or even automatically under the effect of a severe impact.

When the rear part (26) of each of the tunnels (20) opens like a door for embarking or disembarking passengers, the rear end of the fixed section (24) is connected to an airport access gangway (not shown) or to a ground transfer vehicle (not shown). In any case, the width of the gangway or of the vehicle should preferably be matched to that of the tunnel, in order to reap the greatest benefit from the possibility of at least three or four passengers abreast using the tunnel.

When the rear section (26) of each of the tunnels (20) is detached from the fixed section (24), for emergency evacuation of the passengers, two different implementation modes may be used.

Figure 3:
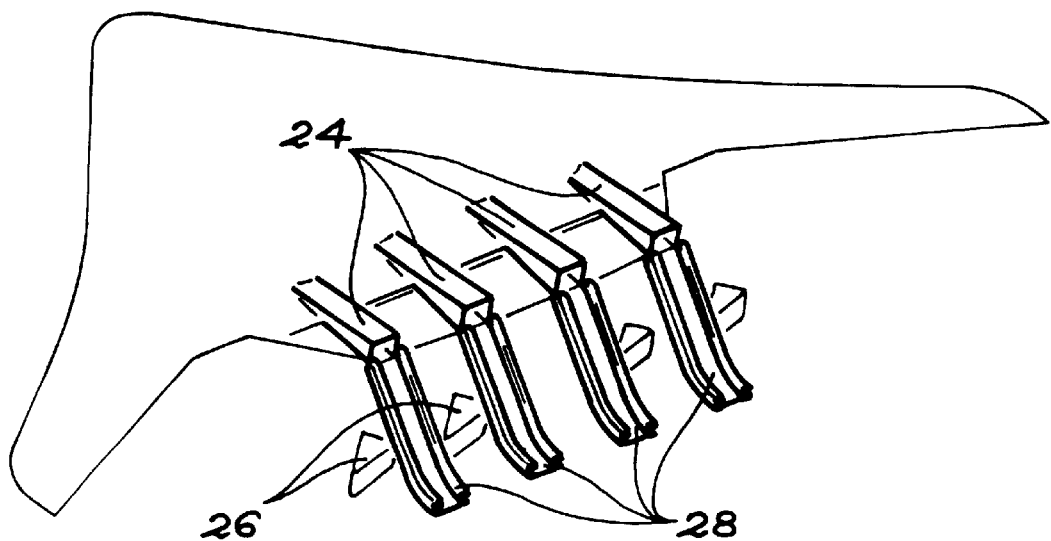
FIG. 3 is a view in perspective showing the first implementation mode of the invention, in which each tunnel is equipped with an inflatable escape slide.

In the first implementation mode, shown in FIG. 3, an inflatable slide (28) is incorporated into the fixed section (24), at the aft end of the latter and at the threshold of the opening formed after jettisoning the rear section (26). As soon as this section (26) has been jettisoned, the slide (28) inflates and forms a ramp which passengers may use to safely descend to ground level. The width of the slide is identical to the width of the tunnel (20), i.e. it permits simultaneous evacuation of at least three or four passengers. The installation of the escape slide (28) into the tunnel (20) may be achieved in the same way as on existing aircraft.

Figure 4:
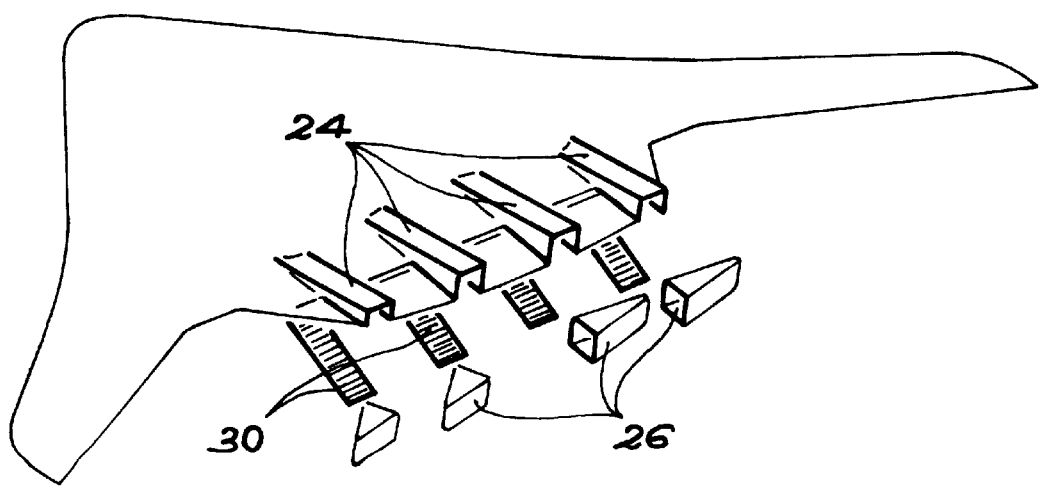
FIG. 4 is a view in perspective, similar to FIG. 3, showing a second implementation mode of the invention, in which emergency evacuation of the passengers is achieved via the articulated floor of each tunnel.
Figure 5:
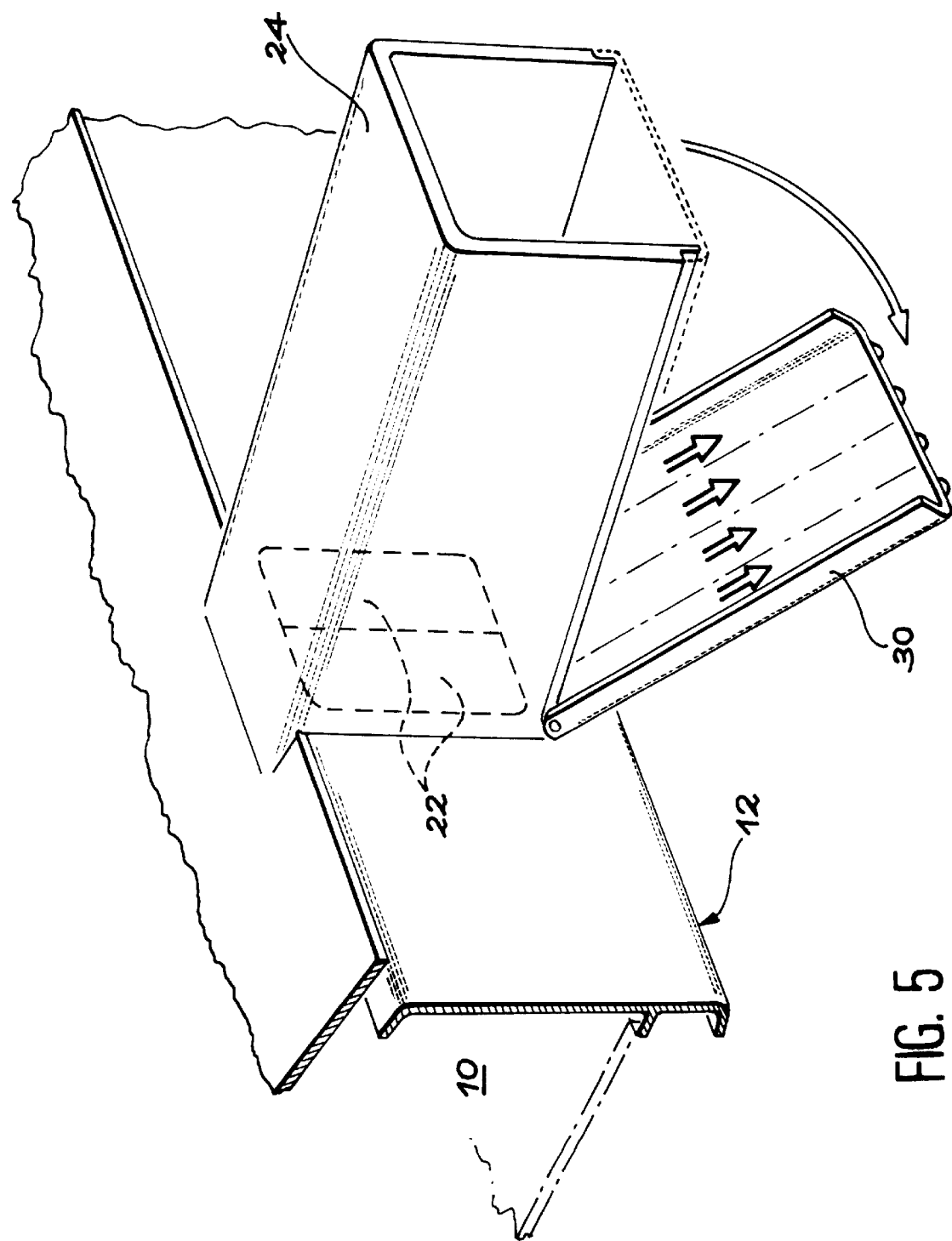
FIG. 5 is a view in perspective showing in much larger scale, one of the tunnels equipped with an articulated floor, in accordance with the second implementation mode of the invention.

In the second implementation mode of the invention, illustrated in FIGS. 4 and 5, the escape slide is deleted and replaced by an articulated floor (30) forming the bottom of the fixed section (24) of each of the tunnels (20).

More precisely, the floor (30) of the fixed section (24) is articulated in the vicinity of the door threshold (22), around a transverse and approximately horizontal axis.

When the aircraft is airborne, the locking devices (not shown) secure the floor (30) to the fixed section (24). Under conditions requiring emergency evacuation of the passengers, these securing devices are released and the floor (30) hinges downwards such that its rear end touches the ground. As before, at least three or four passengers abreast may be evacuated. The release of the securing devices may be triggered in a similar way to the release of the rear section (26). In order to facilitate evacuation of the passengers, and to avoid them from falling off the sides, the floor may incorporate sides, a handrail or a guard-rail.

In this second implementation mode of the invention, passengers may embark or disembark in the same way as before, i.e. by the rear end of the fixed section (24), once the rear section (26) has pivoted to the side about its hinge.

As an alternative, embarking and disembarking of passengers may also be achieved using the articulated floor (30). In such case, the latter can then be fitted with retractable steps, enabling the passengers to climb or descend at least three or four abreast.

As shown in particular in FIG. 2, each of the tunnels (20) is preferably located in-line with one of the aisles (32) which are provided between the rows of seats (34) in the passenger compartment (10), parallel to the longitudinal axis of the flying wing. This layout contributes to enhancing the flow of passengers, both under normal embarking and disembarking conditions and during emergency evacuation.

As shown in the various figures, the tunnels (20) are located at the trailing edge of the aerodynamic fairing (12) of the flying wing, such that each one separates two adjacent elevons (16).

The tunnels (20) thus contribute to guiding the aerodynamic flow to the trailing edge of the elevons. In order to avoid disturbing the aerodynamic flow in this area, the external width of the tunnels is kept approximately constant up to the elevon trailing edges. For the same reason, the external shape of the tunnels is faired in to maintain the continuity of the aircraft shape, in order to avoid any aerodynamic discontinuity which might disturb the airflow.

Moreover, the structural items employed to form the various parts of the tunnel are shaped by implementing the well-known techniques of the trade, in order to be able to withstand the various mechanical stresses to which they are subjected. To achieve this, it is appropriate, for example, to use sandwich materials, with a honeycomb core, to manufacture the articulated or fixed floor of the tunnel.

Of course, the invention is not restricted to the manufacturing modes which have been described above as an example. Thus it should be understood that although the invention is particularly suited to the case of the flying wing, it may also be applied to other more conventional aircraft, in particular for ultra large capacity aircraft.

Moreover, the tunnel or tunnels may possibly be fitted with at least one side access door for embarking and disembarking passengers, if this is justified by the installations at certain airports.

Additionally, the shape of the tunnel and that of its rear section may differ significantly from those described.

The same applies to the number of tunnels and the number of passengers likely to embark or disembark abreast.

Finally, it is important to note that although the invention is particularly suited to passenger airliners, it may also be applied to freight transport aircraft. In such case, loading and unloading of freight benefit from the same advantages as do the passengers in the implementation modes described.

We claim:

1. Boarding access device, for an aircraft including a passenger compartment delimited by the aerodynamic shell of the aircraft, the device being characterised by the fact that it consists of at least one tunnel mounted on the outside of the said aerodynamic shell, attached to the trailing edge of the latter and orientated rearwards and in a direction approximately parallel to the aircraft longitudinal axis, and a door normally closing off the opening between the passenger compartment and the tunnel.

2. Device in accordance with claim 1, in which the aircraft is a flying wing.

3. Device in accordance with claim 2, in which several tunnels are located between adjacent elevons articulated from the trailing edge of the aerodynamic shell of the flying wing.

4. Device in accordance with claim 1, in which each tunnel is located approximately in-line with the aisle formed between the seat rows in the aircraft passenger compartment.

5. Device in accordance with claim 1, in which each tunnel incorporates at least one rear detachable section, which can be jettisoned in emergency conditions.

6. Device in accordance with claim 5, in which the rear detachable section is articulated from a fixed front section of the tunnel, in order to be able to pivot to one side, like a door, to enable passengers to embark and disembark.

7. Device in accordance with claim 5, in which the rear detachable part of each tunnel is shaped approximately like a cone.

8. Device in accordance with claim 5, in which an inflatable escape slide is fitted in each tunnel, at the rear of the front fixed section on which the rear detachable section is mounted.

9. Device in accordance with claim 5, in which a fixed front section of each tunnel, to which the rear detachable section is mounted, incorporates a floor articulated close to the threshold of the door, the said floor being able to hinge downwards to form an escape slide for the emergency evacuation of passengers.

10. Device in accordance with claim 9, in which the articulated floor is fitted with steps, for embarking and disembarking passengers.

11. Flying wing including a passenger compartment delimited by an aerodynamic shell and a boarding access device consisting of at least one tunnel attached to the outside of the said aerodynamic shell, attached to the trailing edge of the latter and orientated rearwards in a direction approximately parallel to the longitudinal axis of the aircraft, and with a door normally closing off the opening between the passenger compartment and the tunnel.

* * * * *